(12) United States Patent
Ramanjani

(10) Patent No.: US 11,735,208 B2
(45) Date of Patent: *Aug. 22, 2023

(54) SYSTEMS AND METHODS FOR CLASSIFICATION AND RATING OF CALLS BASED ON VOICE AND TEXT ANALYSIS

(71) Applicant: Fidelity Information Services, LLC, Jacksonville, FL (US)

(72) Inventor: Rajiv Ramanjani, Karnataka (IN)

(73) Assignee: FIDELITY INFORMATION SERVICES, LLC, Jacksonville, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/977,893

(22) Filed: Oct. 31, 2022

(65) Prior Publication Data

US 2023/0066797 A1    Mar. 2, 2023

Related U.S. Application Data

(63) Continuation of application No. 17/088,365, filed on Nov. 3, 2020, now Pat. No. 11,521,642.

(30) Foreign Application Priority Data

Sep. 11, 2020   (IN) .............................. 202011039256

(51) Int. Cl.
*G10L 25/63*   (2013.01)
*G06F 16/904*  (2019.01)
*G06F 40/30*   (2020.01)
*G10L 15/08*   (2006.01)
*G06F 18/24*   (2023.01)
(Continued)

(52) U.S. Cl.
CPC ............ *G10L 25/63* (2013.01); *G06F 16/904* (2019.01); *G06F 18/24* (2023.01); *G06F 40/30* (2020.01); *G10L 15/08* (2013.01); *G06F 40/35* (2020.01); *G10L 15/1807* (2013.01);
(Continued)

(58) Field of Classification Search
None
See application file for complete search history.

(56) References Cited

U.S. PATENT DOCUMENTS 7,983,910 B2   7/2011  Subramanian et al.
8,140,368 B2   3/2012  Eggenberger et al.
(Continued)

*Primary Examiner* — Richard Z Zhu
(74) *Attorney, Agent, or Firm* — Finnegan, Henderson, Farabow, Garrett & Dunner LLP

(57) ABSTRACT

Methods and systems include sending recording data of a call to a first server and a second server, wherein the recording data includes a first voice of a first participant of the call and a second voice of a second participant of the call; receiving, from the first server, a first emotion score representing a degree of a first emotion associated with the first voice, and a second emotion score representing a degree of a second emotion associated with the first voice; receiving, from the second server, a first sentiment score, a second sentiment score, and a third sentiment score; determining a quality score and classification data for the recording data based on the first emotion score, the second emotion score, the first sentiment score, the second sentiment score, and the third sentiment score; and outputting the quality score and the classification data for visualization of the recording data.

20 Claims, 3 Drawing Sheets

(51) Int. Cl.
    *G10L 15/30*    (2013.01)
    *H04M 3/51*    (2006.01)
    *G10L 15/26*    (2006.01)
    *G06F 40/35*    (2020.01)
    *G10L 25/60*    (2013.01)
    *G10L 15/18*    (2013.01)

(52) U.S. Cl.
    CPC .............. *G10L 15/26* (2013.01); *G10L 15/30* (2013.01); *G10L 25/60* (2013.01); *H04M 3/5175* (2013.01)

(56) References Cited

U.S. PATENT DOCUMENTS

| | | |
|---|---|---|
| 8,676,586 B2 | 3/2014 | Wasserblat et al. |
| 9,728,186 B2 | 8/2017 | Carbonell et al. |
| 10,015,316 B1 * | 7/2018 | Horne .................... G06Q 50/01 |
| 10,044,865 B2 | 8/2018 | Dumaine et al. |
| 10,069,971 B1 * | 9/2018 | Shaw .................. H04M 3/5133 |
| 10,083,686 B2 | 9/2018 | Okabe et al. |
| 10,606,345 B1 | 3/2020 | Chou et al. |
| 10,708,425 B1 * | 7/2020 | Hernandez ............. G10L 25/63 |
| 10,896,428 B1 | 1/2021 | Balasubramaniam et al. |
| 10,999,435 B1 * | 5/2021 | Serna .................. H04M 3/5166 |
| 11,019,211 B1 | 5/2021 | Kwak et al. |
| 11,244,684 B2 | 2/2022 | Malpani |
| 2003/0154072 A1 | 8/2003 | Young et al. |
| 2007/0208569 A1 * | 9/2007 | Subramanian ...... G10L 19/0018 704/E19.007 |
| 2008/0270123 A1 | 10/2008 | Levanon et al. |
| 2009/0125814 A1 | 5/2009 | Willcock |
| 2014/0330566 A1 | 11/2014 | Redfern |
| 2015/0003595 A1 | 1/2015 | Yaghi et al. |
| 2020/0195779 A1 | 6/2020 | Weisman et al. |
| 2020/0257762 A1 | 8/2020 | Eskamani et al. |

\* cited by examiner

SYSTEMS AND METHODS FOR CLASSIFICATION AND RATING OF CALLS BASED ON VOICE AND TEXT ANALYSIS

CROSS REFERENCE TO RELATED APPLICATIONS

This application is a continuation of U.S. patent application Ser. No. 17/088,365, filed on Nov. 3, 2020, which claims the benefit of priority of Indian Patent Application No. 2020-11039256, filed on Sep. 11, 2020. The contents of the foregoing applications are incorporated herein by reference in their entirety.

TECHNICAL FIELD

The present disclosure generally relates to computerized methods and systems for classification and rating of calls and, more particularly, to computerized methods and systems for classification and rating of calls in a call center or in a voice-based setup of business process outsourcing (BPO).

BACKGROUND

Quality analysis on business performance and customer service usually involves analyzing voice calls recorded at call centers or BPO institutions. Based on the analysis of the recorded calls, business performance indicators, customer profile data, potential market demands, consumer feedbacks, or other business-strategy related data can be generated for staff training, business problem analysis, market investigation, or any other business decision making activity. Due to the large amount of recorded calls, computer systems are typically used to generate such business-strategy related data. A technical problem is that very few of the recorded calls can be evaluated or analyzed. In some cases, only 1% of the recorded calls may be randomly selected for analysis. As a result, the majority of the recorded calls are not being reviewed or evaluated.

In many cases, the selected recorded calls are reviewed manually. For example, an individual may have to listen to the recorded calls for analysis. On average, a single recorded call may take 10 minutes to evaluate. Such a non-automatic way of analysis may incur high costs in time and human resources.

Moreover, existing solutions may provide limited capability in transcribing the recorded calls for analysis. Some software may provide call transcription functions, in which speeches in the recorded calls may be converted to texts. However, some of that software may be unable to separate (or referred to as "diarize") speeches of different participants or individuals involved in the recorded calls, such as a customer and an agent, into diarized transcripts. In such as case, further analysis of the transcripts of the recorded calls may become unfeasible or inaccurate, and searching for specific portions in the recorded calls using one or more keywords may be inconvenient or even impractical. Another technical problem with some existing transcription software is that the voice changes (e.g., tones, pitches, speeds) that carries non-speech information (e.g., emotions or sentiments) may be lost after the transcription.

SUMMARY

One aspect of the present disclosure is directed to a system. The system includes a non-transitory computer-readable medium configured to store instructions and at least one processor configured to execute the instructions to perform operations. The operations include sending recording data of a call to a first server and a second server, wherein the recording data includes a first voice of a first participant of the call and a second voice of a second participant of the call, and the system does not include the first server or the second server; receiving, from the first server, a first emotion score representing a degree of a first emotion associated with the first voice, and a second emotion score representing a degree of a second emotion associated with the first voice; receiving, from the second server, a first sentiment score associated with a first transcript of both the first voice and the second voice, a second sentiment score associated with a second transcript of the first voice, and a third sentiment score associated with a third transcript of the second voice; determining a quality score and classification data for the recording data based on the first emotion score, the second emotion score, the first sentiment score, the second sentiment score, and the third sentiment score; and outputting the quality score and the classification data for visualization of the recording data.

Other aspects of the present disclosure are directed to computer-implemented methods for performing the functions of the systems discussed above.

Other systems, methods, and computer-readable media are also discussed herein.

DETAILED DESCRIPTION

Figure 1:
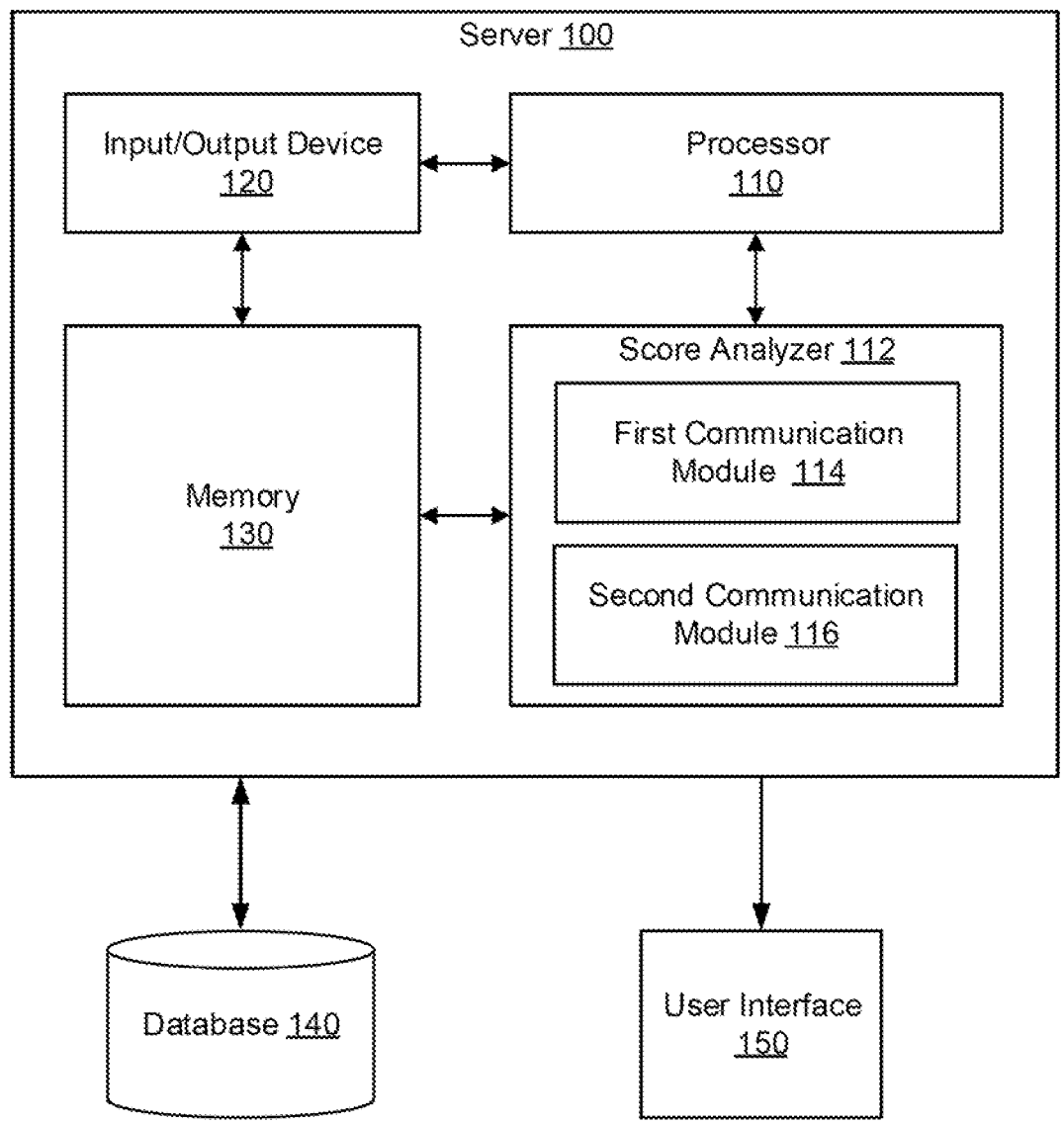
FIG. 1 is a block diagram of an example server computer system for classification and rating of calls based on voice and text analysis, consistent with the disclosed embodiments.

The disclosed embodiments include systems and methods for classification and rating of calls based on voice and text analysis. Before explaining certain embodiments of the disclosure in detail, it is to be understood that the disclosure is not limited in its application to the details of construction and to the arrangements of the components set forth in the following description or illustrated in the drawings. The disclosure is capable of embodiments in addition to those described and of being practiced and carried out in various ways. Also, it is to be understood that the phraseology and terminology employed herein, as well as in the accompanying drawings, are for the purpose of description and should not be regarded as limiting.

As such, those skilled in the art will appreciate that the conception upon which this disclosure is based may readily be utilized as a basis for designing other structures, methods, and systems for carrying out the several purposes of the present disclosure.

Reference will now be made in detail to the present example embodiments of the disclosure, examples of which are illustrated in the accompanying drawings. Wherever possible, the same reference numbers will be used throughout the drawings to refer to the same or like parts.

FIG. 1 is a block diagram of an example server computer system 100 (referred to as "server 100" hereinafter), consistent with the disclosed embodiments. Server 100 may be one or more computing devices configured to execute software instructions stored in memory to perform one or more processes consistent with the disclosed embodiments. For example, server 100 may include one or more memory devices for storing data and software instructions and one or more hardware processors to analyze the data and execute the software instructions to perform server-based functions and operations (e.g., back-end processes). The server-based functions and operations may be classification and rating of calls based on voice and text analysis.

In FIG. 1, server 100 includes a hardware processor 110, an input/output (I/O) device 120, and a memory 130. It should be noted that server 100 may include any number of those components and may further include any number of any other components. Server 100 may be standalone, or it may be part of a subsystem, which may be part of a larger system. For example, server 100 may represent distributed servers that are remotely located and communicate over a network.

Processor 110 may include or one or more known processing devices, such as, for example, a microprocessor. In some embodiments, processor 110 may include any type of single or multi-core processor, mobile device microcontroller, central processing unit, etc. In operation, processor 110 may execute computer instructions (e.g., program codes) and may perform functions in accordance with techniques described herein. Computer instructions may include routines, programs, objects, components, data structures, procedures, modules, and functions, which may perform particular processes described herein. In some embodiments, such instructions may be stored in memory 130, processor 110, or elsewhere.

I/O device 120 may be one or more devices configured to allow data to be received and/or transmitted by server 100. I/O device 120 may include one or more customer I/O devices and/or components, such as those associated with a keyboard, mouse, touchscreen, display, etc. I/O device 120 may also include one or more digital and/or analog communication devices that allow server 100 to communicate with other machines and devices, such as other components of server 100. I/O device 120 may also include interface hardware configured to receive input information and/or display or otherwise provide output information. For example, I/O device 120 may include a monitor configured to display a customer interface.

Memory 130 may include one or more storage devices configured to store instructions used by processor 110 to perform functions related to disclosed embodiments. For example, memory 130 may be configured with one or more software instructions associated with programs and/or data.

Memory 130 may include a single program that performs the functions of the server 100, or multiple programs. Additionally, processor 110 may execute one or more programs located remotely from server 100. Memory 130 may also store data that may reflect any type of information in any format that the system may use to perform operations consistent with disclosed embodiments. Memory 130 may be a volatile or non-volatile (e.g., ROM, RAM, PROM, EPROM, EEPROM, flash memory, etc.), magnetic, semiconductor, tape, optical, removable, non-removable, or another type of storage device or tangible (i.e., non-transitory) computer-readable medium.

Consistent with the disclosed embodiments, server 100 includes a score analyzer 112 that may include a first communication module 114 and a second communication module 116. Score analyzer 112 may be configured to communicate with (e.g., by sending data to or receiving data from) a first computer system (or a "first server") via first communication module 114 and to communicate with a second computer system (or a "second server") via second communication module 116. Score analyzer 112 may be implemented as software (e.g., program codes stored in memory 130), hardware (e.g., a specialized chip incorporated in or in communication with processor 110), or a combination of both.

First communication module 114 may be configured to communicate with the first server to receive a first type of data (e.g., scores of the voice recording determined based on analysis of the voice) related to a voice recording. Second communication module 116 may be configured to communicate with the second server to receive a second type of data (e.g., scores of the voice recording determined based on analysis of a computer-generated transcript of the voice) related to the voice recording. In some embodiments, first communication module 114 and/or a second communication module 116 may be organized or arranged separately from score analyzer 112. In further embodiments, first communication module 114 and second communication module 116 may be combined into one module serving the functions of both modules.

Server 100 may also be communicatively connected to one or more databases 140. For example, server 100 may be communicatively connected to database 140. Database 140 may be a database implemented in a computer system (e.g., a database server computer). Database 140 may include one or more memory devices that store information (e.g., voice data of multiple recordings) and are accessed and/or managed through server 100. By way of example, database 140 may include Oracle™ databases, Sybase™ databases, or other relational databases or non-relational databases, such as Hadoop sequence files, HBase, or Cassandra. Systems and methods of disclosed embodiments, however, are not limited to separate databases. In one aspect, server 100 may include database 140. Alternatively, database 140 may be located remotely from the server 100. Database 140 may include computing components (e.g., database management system, database server, etc.) configured to receive and process memory requests for data stored in memory devices of database 140 and to provide data from database 140.

Server 100 may also be communicatively connected to one or more user interface 150. User interface 150 may include a graphical interface (e.g., a display panel), an audio interface (e.g., a speaker), or a haptic interface (e.g., a vibration motor). For example, the display panel may include a liquid crystal display (LCD), a light-emitting diode (LED), a plasma display, a projection, or any other type of display. The audio interface may include microphones, speakers, and/or audio input/outputs (e.g., headphone jacks). In some embodiments, user interface 150 may be included in server 100. In some embodiments, user interface 150 may be included in a separate computer system. User interface 150 may be configured to display data transmitted from server 100.

In connection with server 100 as shown and described in FIG. 1, the systems and methods as described herein may provide a technical solution to technical problems in analyzing calls recorded at call centers or BPO institutions. Aspects of this disclosure may relate to classification and rating of calls based on voice and text analysis, including systems, apparatuses, methods, and non-transitory computer-readable media. For ease of description, a method is described below, with the understanding that aspects to the method apply equally to systems, apparatuses, and non-transitory computer-readable media. For example, some aspects of such a method can be implemented by a system (e.g., server 100 and database 140), an apparatus (e.g., server 100), or as program codes or computer instructions stored in a non-transitory computer-readable medium (e.g., memory 130 or another storage device of server 100). In a broadest sense, the method is not limited to any particular physical or electronic instrumentalities, but rather can be accomplished using many different instrumentalities.

Consistent with some embodiments of this disclosure, a method may include sending recording data of a call to a first server and a second server. The recording data may include a first voice of a first participant of the call and a second voice of a second participant of the call. The "sending," as used herein, may refer to transmitting, transferring, transporting, forwarding, delivering, dispatching, routing, writing, conveying, or any operation for outputting. The "recording data," as used herein, may refer to any data related to a recording of one or more voices, such as one or more computerized audio files in a waveform format or a compressed format. The participant of a call, as used herein, may include an individual or a human being that is a party of a conversation of the call, such as customers of a service provider (e.g., a company, a nonprofit organization, a government agency, or any entity that provides any kind of private or public service), agents of the service provider, or third-party persons. For example, the first participant may be a customer, and the second participant may be an agent. The voice of the participant, as used herein, may include sound produced by the participant in the call, such as speeches or non-speech sounds.

In some embodiments, the first server and the second server may be different from each other and different from the system or apparatus that implements the method. For example, the first server and the second server may be different computer systems (e.g., in different cloud service networks). In some embodiments, the first server and the second server may be the same computer system.

Figure 2:
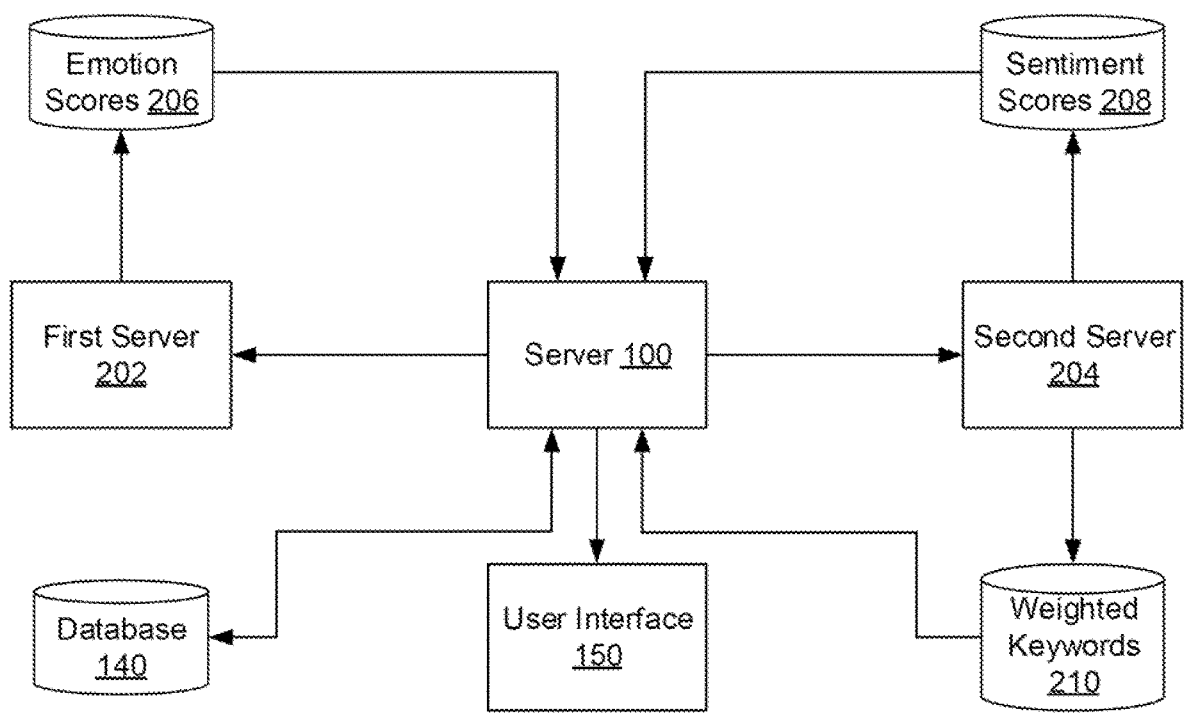
FIG. 2 is a flowchart of an example system for classification and rating of calls based on voice and text analysis, consistent with the disclosed embodiments.

By way of example, FIG. 2 is a diagram of an example system 200 for classification and rating of calls based on voice and text analysis, consistent with the disclosed embodiments. FIG. 2 includes server 100, database 140, user interface 150, first server 202, second server 204, emotion scores 206 outputted by first server 202, sentiment scores 208 outputted by second server 204, and weighted keywords 210 outputted by second server 204. In some embodiments, server 100 may perform the method for classification and rating of calls based on voice and text analysis. Server 100 may send recording data of the call to first server 202 and second server 204. In some embodiments, the recording data may be stored in database 140 and retrieved by server 100. As illustrated in FIG. 2, first server 202 and second server 204 are different computer systems.

Consistent with some embodiments of this disclosure, the method for classification and rating of calls based on voice and text analysis may also include receiving, from the first server, a first emotion score representing a degree (e.g., an intensity) of a first emotion associated with the first voice, and a second emotion score representing a degree of a second emotion associated with the first voice. The "receiving," as used herein, may refer to accepting, taking in, admitting, gaining, acquiring, retrieving, obtaining, reading, accessing, collecting, or any operation for inputting. The "emotion," as used herein, may refer to a state of mind, a feeling, a conscious mental reaction, or any psychological or physiological change of a human being in response to a mood.

The emotion score, as used herein, may include a numerical value (e.g., an integer, a real number, or a percentage) representing a degree of an emotion for the call as a whole. In some embodiments, each of the first emotion and the second emotion may be selected from anger, happiness, sadness, fear, or neutrality. By way of example, as illustrated in FIG. 2, server 100 may receive emotion scores 206 (including the first emotion score and the second emotion score) from first server 202.

In some embodiments, the first server may determine the first emotion score and the second emotion score using a voice-based emotion scoring technique. The voice-based emotion scoring technique may include an algorithm, an artificial intelligence (AI) technique, or a deep learning technique for determining the emotion score. For example, the voice-based emotion scoring technique may define a plurality of emotions as measurement dimensions, and determine (e.g., using the AI or deep learning technique) an emotion score for each of the emotions based on a voice (e.g., without transcribed into texts) in the recording data. By way of example, Table 1 illustrates outputs of an example voice-based emotion scoring technique.

TABLE 1

| Participant | Anger | Happiness | Sadness | Fear | Neutral |
|---|---|---|---|---|---|
| Person 1 | 99.70% | 0.30% | 0.00% | 0.00% | 0.00% |
| Person 2 | 5.60% | 0.00% | 2.60% | 0.00% | 91.80% |
| Person 3 | 33.00% | 65.70% | 0.60% | 0.10% | 0.70% |

Table 1 illustrates three participants ("Person 1," "Person 2," and "Person 3") that may be in the same call (e.g., as in a three-way conference call) or in different calls (e.g., three separate calls). For example, each of Person 1, Person 2, and Person 3 may be a customer, an agent, or a third-party person. Table 1 also illustrates five predetermined emotions: anger, happiness, sadness, fear, and neutrality (e.g., no emotion). In Table 1, if the first participant (who has the first voice) is Person 1, the first emotion is anger, and the second emotion is happiness, then the first emotion score is 99.7%, and the second emotion score is 0.3%.

Using the voices of the participants in corresponding recording data as input, the voice-based emotion scoring technique may determine emotion scores (represented as percentages) for each of the participant under each of the predetermined emotions. For example, for Person 1, the voice-based emotion scoring technique may determine that his/her voice has a composition of 99.7% of anger and 0.3% happiness, which may indicate that it is highly likely that Person 1 was angry in the recorded call. As another example, for Person 3, the voice-based emotion scoring technique may determine that his/her voice has a composition of 33% anger, 65.7% happiness, 0.6% sadness, 0.1% fear, and 0.7% neutral, which may indicate that Person 3 had mixed emotions in the recorded call where happiness is the most significant composition. It should be noted that, although Table 1 shows only five emotions, the voice-based emotion scoring technique may use more or fewer emotions as measurement dimensions, and this disclosure does not limit the number of predetermined emotions to be used in the voice-based emotion scoring technique.

In some embodiments, the recording data may include a first recording of both the first voice and the second voice, a second recording of the first voice, and a third recording of the second voice. By way of example, if the first participant is a customer, and the second participant is an agent, then the first recording may be a continuous recording that includes conversations between the customer and the agent, the second recording may include the speeches of the customer, and the third recording may include the speeches of the agent.

In some embodiments, the method for classification and rating of calls based on voice and text analysis may further include generating the second recording and the third recording from the first recording, and sending the second recording to the first server for determining the first emotion score and the second emotion score. For example, to generate the second recording and the third recording, the method may involve dividing the recording data into multiple pieces of personal recording data (e.g., multiple audio files), each of which may include a voice of the same participant. Personal recording data of the first participant and the second participant may then be merged to generate the second recording and the third recording, respectively. For example, the method may involve identifying and separating the recordings from the recording data based on one or more voice characteristics (e.g., pitch, tone, speed, or any audio profile) of voices in the recording data.

In some embodiments, after generating the second recording and the third recording from the first recording, the method may further include sending the third recording to the first server for determining a third emotion score representing a degree of the first emotion associated with the second voice and a fourth emotion score representing a degree of the fourth emotion associated with the second voice. For example, in Table 1, if the second participant (who has the second voice) is Person 2, the first emotion is anger, and the second emotion is happiness, then the third emotion score is 5.6%, and the fourth emotion score is 0%.

Consistent with some embodiments of this disclosure, the method for classification and rating of calls based on voice and text analysis may further include receiving, from the second server, a first sentiment score associated with a first transcript of both the first voice and the second voice, a second sentiment score associated with a second transcript of the first voice, and a third sentiment score associated with a third transcript of the second voice. The "sentiment," as used herein, may refer to an attitude, an opinion, a thought, a judgment, a notion, or any view of a human being prompted by a feeling. The sentiment is different from the emotion as described herein. The sentiment score may include a numerical value (e.g., an integer, a real number, or a percentage) representing a degree of a sentiment. By way of example, as illustrated in FIG. 2, server 100 may receive sentiment scores 208 (including the first, second, and third sentiment scores) from second server 204.

In an example, if the first participant is a customer, and the second participant is an agent, then the first transcript may be a conversational transcript that includes texts of the conversations between the customer and the agent, the second transcript may include texts of the speeches of the customer, and the third transcript may include texts of the speeches of the agent.

In some embodiments, the second server may generate the first, second, and third transcripts using a speech-to-text technique using the first voice and the second voice as inputs. The second server may generate the first transcript by applying an AI or deep learning algorithm for speech recognition to the recording data (e.g., an audio file) that include the first voice and the second voice. For example, such algorithms may include a hidden Markov model (HMM) algorithm, a dynamic time warping (DTW) based algorithm, a neural network, an end-to-end automatic speech recognition (ASR) algorithm, or any statistic-based algorithm for recognizing speech or processing natural language.

In some embodiments, to generate the second transcript and the third transcript, the second server may apply the speech-to-text technique to the recording data in a multi-channel mode where multiple texts from different voice sources may be generated from a single audio file. For example, based on one or more voice characteristics (e.g., pitch, tone, speed, or any audio profile) of voices in the recording data, the second server may identify and label different speakers in the recording data, and merge the texts transcribed from speeches of the same speaker into a single transcript for that speaker.

In some embodiments, to generate the second transcript and the third transcript, the second server may divide the recording data into multiple recordings (e.g., the second recording and the third recording as described above), each of which may include a voice of the same participant, and then apply the speech-to-text technique to the recordings to generate a transcript for that participant. For example, the second server may identify and separate the recordings from the recording data based on one or more voice characteristics (e.g., pitch, tone, speed, or any audio profile) of voices in the recording data.

In some embodiments, each of the first sentiment score, the second sentiment score, and the third sentiment score may represent a degree of a positive reaction to the call. In some embodiments, the first, second, and third sentiment scores may represent a degree of a negative reaction to the call. In some embodiments, the second server may determine the first, second, and third sentiment scores by applying a text-based sentiment scoring technique to the first transcript (e.g., the transcript including both the customer's and the agent's speeches), the second transcript (e.g., the transcript including the customer's speeches), and the third transcript (e.g., the transcript including the agent's speeches), respectively. The text-based sentiment scoring technique may include an algorithm, an artificial intelligence (AI) technique, or a deep learning technique for determining the sentiment score representing a degree of a sentiment (e.g., a general feel or impression). For example, the text-based sentiment scoring technique may define a plurality of sentiments as measurement dimensions, and determine (e.g., using the AI or deep learning technique) a sentiment score for each of the sentiments based on a transcript. By way of example, Table 2 illustrates outputs of an example text-based sentiment scoring technique.

TABLE 2

| Call Recording | Customer Sentiment | Agent Sentiment | Overall Sentiment |
| --- | --- | --- | --- |
| Recording 1 | 3.61% | 88.98% | 51.04% |
| Recording 2 | 11.17% | 81.24% | 79.74% |
| Recording 3 | 95.10% | 97.41% | 98.08% |

Table 2 illustrates three call recordings ("Recording 1," "Recording 2," and "Recording 3"). For example, the three call recordings may be recorded from three calls between a customer and an agent, in which the customer and the agent may be different in each call. Table 2 also illustrates three categories of sentiments: a customer sentiment, an agent sentiment, and an overall sentiment that represent a combined sentiment from the customer and the agent. In Table 2, the sentiment scores may represent a degree of positive reactions. The higher the sentiment scores are, the more positive the reactions may be. The sentiment scores may be generated based on texts outputted by a speech-to-text technique applied to the recordings.

For example, in Recording 1, the agent has an 88.98% sentiment score, and the customer has a 3.61% sentiment score, which represents that the agent feels positive (e.g., because the agent thinks of having solved the customer's problem) regarding the call of Recording 1, but the customer fees negative (e.g., because the customer feels that his or her problem is unresolved) regarding the call of Recording 1. In such a case, the overall sentiment score of Recording 1 is 51.04%, which is close to a neutral overall impression. As another example, in Recording 3, because the agent and the customer have similarly high sentiment scores, the overall sentiment score is also very high, indicating both the customer and the agent having positive reactions to the call of Recording 3. It should be noted that, although Table 2 shows only sentiment scores for two-party calls (e.g., customers and agents), the text-based sentiment scoring technique may be applied to a multi-party call (e.g., customers, agents, and third-party persons), and this disclosure does not limit the number of parties involved in the text-based sentiment scoring technique.

Consistent with some embodiments of this disclosure, the method for classification and rating of calls based on voice and text analysis may further include determining a quality score and classification data for the recording data based on the first emotion score, the second emotion score, the first sentiment score, the second sentiment score, and the third sentiment score. The quality score of the recording data may include a comprehensive score that represents an overall quality of the call corresponding to the recording data. The classification data of the recording data, as used herein, may include any data that is indicative a classification (e.g., a label or a tag) of the call corresponding to the recording data. For example, the classification data may be indicative of a negative label, a positive label, or a neutral label for the call.

In some embodiments, to determine the quality score and the classification data for the recording data, the method may include determining (e.g., by server 100 in FIG. 1) the quality score as a weighted sum of the first emotion score, the second emotion score, the first sentiment score, the second sentiment score, and the third sentiment score. For example, in determining the weighted sum, each of the first emotion score, the second emotion score, the first sentiment score, the second sentiment score, and the third sentiment score may be assigned with a weight. The method may also include determining the classification data based on the quality score. For example, the quality scores may be divided into a set of predetermined ranges (e.g., 0-0.4, 0.4-0.7, and 0.7-1.0). Each predetermined range can be associated with a label (e.g., 0-0.4 being associated with "negative," 0.4-0.7 being associated with "neutral," and 0.7-1.0 being associated with "positive"). When the quality score falls into one of the predetermined ranges, the label corresponding to that range may be determined as the classification data.

For example, the first emotion score, the second emotion score, the first sentiment score, the second sentiment score, and the third sentiment score may be represented as $E_1$, $E_2$, $S_1$, $S_2$, and $S_3$, respectively. Weights associated with $E_1$, $E_2$, $S_1$, $S_2$, and $S_3$ may be represented as $w_{E1}$, $w_{E2}$, $w_{S1}$, $w_{S2}$, and $w_{S3}$, respectively, where $w_{E1}+w_{E2}+w_{S1}+w_{S2}+w_{S3}=1$. Then, the quality score QS may be calculated as $QS=E_1 \ast w_{E1}+ E_2 \ast w_{E2}+S_1 \ast w_{S1}+S_2 \ast w_{S2}+S_3 \ast w_{S3}$.

In some embodiments, emotion scores having higher values may be assigned with higher weights. For example, in a case where the first emotion score is higher than the second emotion score (e.g., $E_1>E_2$), a weight of the first emotion score may be higher than a weight of the second emotion score (e.g., $w_{E1}>w_{E2}$). By way of example, in Table 1, if the first participant is Person 1, the first emotion score is the 99.7% (assuming the first emotion being "anger"), and the second emotion score is 0.3% (assuming the second emotion being "happiness"), then a weight of the first emotion score may be higher than a weight of the second emotion score. By doing so, the dominant or most significant emotion may be ensured to be reflected in the quality score, and the less significant emotions may be used to balance out aberrations to avoid an overfitting problem.

In some embodiments, the weight of the emotion score may be proportional (e.g., linearly proportional). As an example, if the first emotion score and the second emotion score is 99.7% and 0.3%, the weights of them may be 0.997 and 0.003, respectively. In some embodiments, the weight of the emotion score may be positively correlated but not proportional. For example, if the first emotion score and the second emotion score is 99.7% and 0.3%, the weights of them may be 0.7 and 0.3, respectively. It should be noted that the manner of assigning weights to emotion scores can be various and are not limited to the examples described herein.

In some embodiments, sentiment scores of customers may be assigned with higher weights. For example, in a case where the first participant is a customer, and the second participant is an agent, a weight of the second sentiment score may be higher than a weight of the first sentiment score or a weight of the third sentiment score (e.g., $w_{S2}>w_{S1}$ and $w_{S2}>w_{S3}$). By way of example, in Table 2, if the first, second, and third sentiment scores are overall sentiment score, customer sentiment score, and the agent sentiment score, respectively, then the weight of the customer sentiment score may be higher than the weight of the overall sentiment score or the weight of the agent sentiment score. By doing so, the customer sentiments may be ensured to be reflected in the quality score in a case where the quality score is designed to mainly reflect customer reactions, and the agent sentiments and overall sentiments may be used to balance out aberrations to avoid an overfitting problem.

In some embodiments, sentiment scores of agents may be assigned with higher weights in a case where the quality score is designed to mainly reflect agent handlings of the calls. For example, such quality scores may be used as gauge in agent training. In some embodiments, no matter how the sentiment scores are weighted, the agent sentiment scores can be independently used as gauge in the agent training.

Consistent with some embodiments of this disclosure, the method for classification and rating of calls based on voice and text analysis may further include outputting the quality score and the classification data for visualization of the recording data. For example, the quality score may have a range between 0 to 1. The visualization of the recording data can be used to support, for example, staff training, business problem analysis, market investigation, or any other business decision making activity. By way of example, as illustrated in FIG. 2, server 100 may output the quality score and the classification data (e.g., a label of "positive," "negative," or "neutral") to user interface 150 for display.

Consistent with some embodiments of this disclosure, the method for classification and rating of calls based on voice and text analysis may further include receiving, from the second server, a set of weighted keywords, in which each keyword may be associated with a weight value. In some embodiments, the set of weighted keywords may be used to generate a word cloud (or "tag cloud") that is a set of grouped, visualized words where a size of a word represent an importance level (e.g., representing a frequency of occurrence of the word, a statistical significance value of the word, a categorization label of the word, or any indicator of differentiating the word from other words) of the word in the set. For example, a normalized importance level value may be used as a weight value associated with the word, and in such a case, the size of the word may be proportional to the weight value associated with the word. The set of words may be visualized to resemble a shape of a cloud, but it can be visualized to resemble any other shape. The second server may generate the set of weighted keywords based on the first transcript, the second transcript, or the third transcript, such as using a machine learning algorithm. The method may further include outputting the set of weighted keywords, the quality score, and the classification data for visualization of the recording data, which may be used to support business decision making activities. By way of example, as illustrated in FIG. 2, server 100 may receive weighted keywords 210 (including the set of weighted keywords) from second server 204.

Consistent with some embodiments of this disclosure, after receiving the set of weighted keywords from the second server, the method may further include receiving, from the second server, relationship data linking a portion of the recording data and a word in one of the first transcript, the second transcript, or the third transcript, wherein the relationship data enables finding the portion by searching for the word. By doing so, the system implementing the method (e.g., server 100) can provide a user capability of filtering and listening to a specific portion of the call by searching one or more words. For example, the user can search a string of phrase or a keyword in the transcript, and the corresponding portion of the data may be pulled from the recording data for the user.

Consistent with some embodiments of this disclosure, the method may further include receiving, from the first server, a third emotion score representing a degree of the first emotion associated with the second voice and a fourth emotion score representing a degree of the second emotion associated with the second voice, and determining the quality score and the classification data based on the first emotion score, the second emotion score, the third emotion score, the fourth emotion score, the first sentiment score, the second sentiment score, and the third sentiment score. By way of example, in Table 1, if the first participant (who has the first voice) is Person 1, the second participant (who has the second voice) is Person 2, the first emotion is anger, and the second emotion is happiness, then the first emotion score is 99.7%, the second emotion score is 0.3%, the third emotion score is 5.6%, and the fourth emotion score is 0%. In some embodiments, the quality score may be determined as a weighted sum of the first emotion score, the second emotion score, the third emotion score, the fourth emotion score, the first sentiment score, the second sentiment score, and the third sentiment score. In some embodiments, the classification data may be determined based on the quality score.

Figure 3:
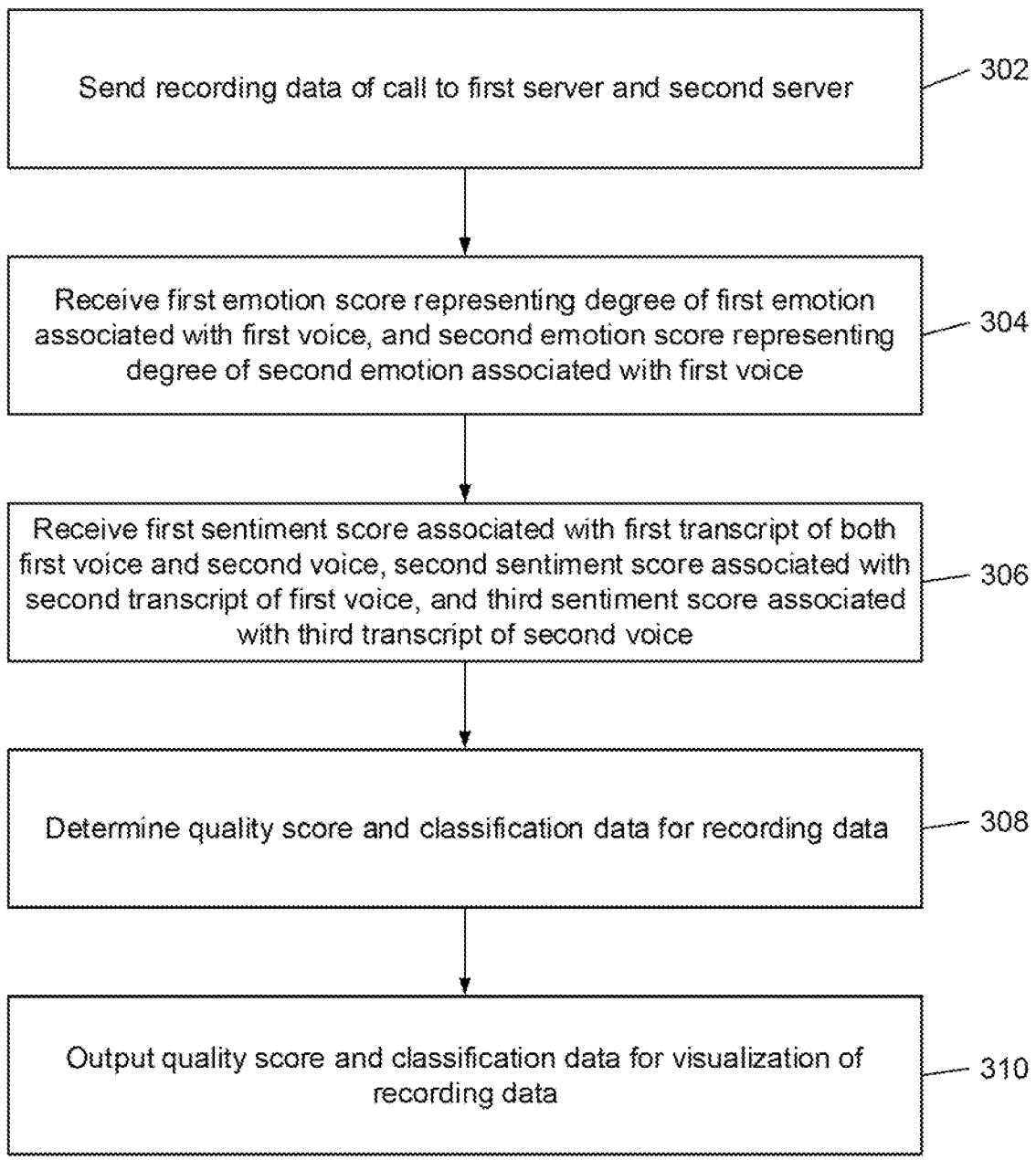
FIG. 3 is a flowchart of an example process for classification and rating of calls based on voice and text analysis in the system shown in FIG. 1, consistent with the disclosed embodiments.

By way of example, FIG. 3 is a flowchart of example process 300 for classification and rating of calls based on voice and text analysis using a system (e.g., server 100) of FIG. 1, consistent with the disclosed embodiments. The system may include a memory (e.g., memory 130) that stores instructions and a processor (e.g., processor 110) programmed to execute the instructions to implement process 300. For example, process 300 may be implemented as one or more software modules (e.g., an API in score analyzer 112) stored in memory 130 and executable by processor 110.

Referring to FIG. 3, at step 302, the processor may send (e.g., via first communication module 114 and second communication module 116 in FIG. 1) recording data of a call to a first server (e.g., first server 202 in FIG. 2) and a second server (e.g., second server 204 in FIG. 2). The recording data may include a first voice of a first participant (e.g., Person 1 in Table 1) of the call and a second voice of a second participant (e.g., Person 3 in Table 1) of the call. In some embodiments, the processor (e.g., processor 110 of server 100) does not belong to either the first server (e.g., first server 202) or the second server (e.g., second server 204).

At step 304, the processor may receive (e.g., via first communication module 114), from the first server, a first emotion score (e.g., the emotion score 99.7% in Table 1) representing a degree of a first emotion (e.g., the emotion "anger" in Table 1) associated with the first voice, and a second emotion score (e.g., the emotion score 0.3% in Table 1) representing a degree of a second emotion (e.g., the emotion "happiness") associated with the first voice. In some embodiments, the first emotion and the second emotion may be selected from anger, happiness, sadness, fear, or neutrality.

In some embodiments, the recording data may include a first recording of both the first voice and the second voice, a second recording of the first voice, and a third recording of the second voice. In some embodiments, the processor may generate the second recording and the third recording from the first recording, and send (e.g., via first communication module 114) the second recording to the first server for determining the first emotion score and the second emotion score.

In some embodiments, the processor may further send (e.g., via first communication module 114) the third recording to the first server for determining a third emotion score (e.g., the emotion score 33.0% in Table 1) representing a degree of the first emotion associated with the second voice and a fourth emotion score (e.g., the emotion score 65.70% in Table 1) representing a degree of the second emotion associated with the second voice.

At step 306, the processor may receive (e.g., via second communication module 116), from the second server, a first sentiment score (e.g., the overall sentiment score 79.74% in Table 2) associated with a first transcript of both the first voice and the second voice, a second sentiment score (e.g., the customer sentiment score 11.17% in Table 2) associated with a second transcript of the first voice, and a third sentiment score (e.g., the agent sentiment score 81.24% in Table 2) associated with a third transcript of the second voice. In some embodiments, each of the first sentiment score, the second sentiment score, and the third sentiment score may represent a degree of a positive reaction to the call.

At step 308, the processor may determine a quality score and classification data for the recording data based on the first emotion score, the second emotion score, the first sentiment score, the second sentiment score, and the third sentiment score. In some embodiments, the processor may determine the quality score as a weighted sum of the first emotion score, the second emotion score, the first sentiment score, the second sentiment score, and the third sentiment score. The processor may further determine the classification data based on the quality score.

In some embodiments, for determining the quality score as the weighted sum, a weight of the first emotion score may be higher than a weight of the second emotion score in response to the first emotion score being higher than the second emotion score. A weight of the second sentiment score may be higher than a weight of the first sentiment score or a weight of the third sentiment score in response to the first participant being a customer and the second participant being an agent.

At step 310, the processor may output the quality score and the classification data for visualization of the recording data. For example, the processor may output the quality score and the classification data to a user interface (e.g., user interface 150 in FIG. 1) for display. In some embodiments, the classification data may be indicative of a negative label, a positive label, or a neutral label.

Consistent with some embodiments of this disclosure, after step 310, the processor may receive (e.g., via second communication module 116) a set of weighted keywords from the second server. Each keyword may be associated with a weight value. The second server may generate the set of weighted keywords based on the first transcript, the second transcript, or the third transcript. The processor may further output the list, the quality score, and the classification data for visualization of the recording data.

In some embodiments, the processor may further receive (e.g., via second communication module 116), from the second server, relationship data linking a portion of the recording data and a word in one of the first transcript, the second transcript, or the third transcript. The relationship data may enable finding the portion by searching for the word.

Consistent with some embodiments of this disclosure, after step 310, the processor may receive (e.g., via first communication module 114), from the first server, a third emotion score (e.g., the emotion score 33.0% in Table 1) representing a degree of the first emotion associated with the second voice and a fourth emotion score (e.g., the emotion score 65.70% in Table 1) representing a degree of the second emotion associated with the second voice. The processor may further determine the quality score (e.g., as a weighted sum) and the classification data based on the first emotion score, the second emotion score, the third emotion score, the fourth emotion score, the first sentiment score, the second sentiment score, and the third sentiment score.

A non-transitory computer-readable medium may be provided that stores instructions for a processor (e.g., processor 110) for classification and rating of calls based on voice and text analysis in accordance with the example flowcharts of FIG. 3 above, consistent with embodiments in the present disclosure. For example, the instructions stored in the non-transitory computer-readable medium may be executed by the processor for performing process 300 in part or in entirety. Common forms of non-transitory media include, for example, a floppy disk, a flexible disk, hard disk, solid-state drive, magnetic tape, or any other magnetic data storage medium, a Compact Disc Read-Only Memory (CD-ROM), any other optical data storage medium, any physical medium with patterns of holes, a Random Access Memory (RAM), a Programmable Read-Only Memory (PROM), and Erasable Programmable Read-Only Memory (EPROM), a FLASH-EPROM or any other flash memory, Non-Volatile Random Access Memory (NVRAM), a cache, a register, any other memory chip or cartridge, and networked versions of the same.

While the present disclosure has been shown and described with reference to particular embodiments thereof, it will be understood that the present disclosure can be practiced, without modification, in other environments. The foregoing description has been presented for purposes of illustration. It is not exhaustive and is not limited to the precise forms or embodiments disclosed. Modifications and adaptations will be apparent to those skilled in the art from consideration of the specification and practice of the disclosed embodiments.

Computer programs based on the written description and disclosed methods are within the skill of an experienced developer. Various programs or program modules can be created using any of the techniques known to one skilled in the art or can be designed in connection with existing software. For example, program sections or program modules can be designed in or by means of .Net Framework, .Net Compact Framework (and related languages, such as Visual Basic, C, etc.), Java, C++, Objective-C, HTML, HTML/AJAX combinations, XML, or HTML with included Java applets.

Moreover, while illustrative embodiments have been described herein, the scope of any and all embodiments having equivalent elements, modifications, omissions, combinations (e.g., of aspects across various embodiments), adaptations and/or alterations as would be appreciated by those skilled in the art based on the present disclosure. The limitations in the claims are to be interpreted broadly based on the language employed in the claims and not limited to examples described in the present specification or during the prosecution of the application. The examples are to be construed as non-exclusive. Furthermore, the steps of the disclosed methods may be modified in any manner, including by reordering steps and/or inserting or deleting steps. It is intended, therefore, that the specification and examples be considered as illustrative only, with a true scope and spirit being indicated by the following claims and their full scope of equivalents.

What is claimed is:

1. A system, comprising:
a non-transitory computer-readable medium configured to store instructions; and
at least one processor configured to execute the instructions to perform operations comprising:
sending recording data of a call to a server, wherein the recording data comprises a first voice of a first participant of the call and a second voice of a second participant of the call;
receiving, from the server, a first emotion score representing a degree of a first emotion associated with the first voice, and a second emotion score representing a degree of a second emotion associated with the first voice, wherein the first emotion score and the second emotion score are determined using a voice-based emotion scoring technique;
receiving, from the server, a first sentiment score associated with a first transcript of both the first voice and the second voice, a second sentiment score associated with a second transcript of the first voice, and a third sentiment score associated with a third transcript of the second voice, wherein the first sentiment score, the second sentiment score, and the third sentiment score are determined using a text-based sentiment scoring technique;
determining a quality score for the recording data based on the first emotion score, the second emotion score, the first sentiment score, the second sentiment score, and the third sentiment score;

determining classification data for the recording based on the quality score; and outputting the quality score and the classification data for visualization of the recording data.

2. The system of claim 1, wherein the recording data comprises a first recording of both the first voice and the second voice, a second recording of the first voice, and a third recording of the second voice.

3. The system of claim 2, wherein the operations further comprise:

generating the second recording and the third recording from the first recording; and sending the second recording to the server for determining the first emotion score and the second emotion score.

4. The system of claim 3, wherein the operations further comprise:

sending the third recording to the server for determining a third emotion score representing a degree of the first emotion associated with the second voice and a fourth emotion score representing a degree of the second emotion associated with the second voice.

5. The system of claim 1, wherein the first emotion and the second emotion are selected from: anger, happiness, sadness, fear, or neutrality.

6. The system of claim 1, wherein the first transcript, the second transcript, and the third transcript are generated using a speech-to-text technique using the first voice and the second voice as inputs.

7. The system of claim 1, wherein determining the quality score for the recording data comprises:

determining the quality score as a weighted sum of the first emotion score, the second emotion score, the first sentiment score, the second sentiment score, and the third sentiment score.

8. The system of claim 7, wherein:

the weighted sum is determined by applying weights to any one or more of: the first emotion score, the second emotion score, the first sentiment score, the second sentiment score, and the third sentiment score; and the weights are determined based on any one of:

a weight of the first emotion score is higher than a weight of the second emotion score in response to the first emotion score being higher than the second emotion score;

the weight of the second sentiment score is higher than the weight of the first sentiment score or a weight of the third sentiment score in response to the first participant being a customer and the second participant being an agent;

the weight of the first emotion score and the weight of the second sentiment score are linearly proportional based on the corresponding emotional score; or the weight of the first emotion score and the weight of the second sentiment score are correlated based on the corresponding emotional score.

9. The system of claim 1, wherein:

the quality score is divided into a set of predetermined ranges;

each predetermined range is associated with a label; and the classification data is the label corresponding to the predetermined range of the quality score.

10. The system of claim 1, wherein the classification data is indicative of a negative label, a positive label, or a neutral label.

11. The system of claim 1, wherein the operations further comprise:

receiving, from the server, a set of weighted keywords, wherein each keyword is associated with a weight value, and the server generates the set of weighted keywords based on the first transcript, the second transcript, or the third transcript; and outputting the set of weighted keywords, the quality score, and the classification data for visualization of the recording data.

12. The system of claim 11, wherein the operations further comprise:

receiving, from the server, relationship data linking a portion of the recording data and a word in one of the first transcript, the second transcript, or the third transcript, wherein the relationship data enables finding the portion of the recording data by searching for the word.

13. The system of claim 1, wherein the operations further comprise:

receiving, from the server, a third emotion score representing a degree of the first emotion associated with the second voice and a fourth emotion score representing a degree of the second emotion associated with the second voice; and determining the quality score based on the first emotion score, the second emotion score, the third emotion score, the fourth emotion score, the first sentiment score, the second sentiment score, and the third sentiment score.

14. A computer-implemented method, comprising:

sending recording data of a call to a server, wherein the recording data comprises a first voice of a first participant of the call and a second voice of a second participant of the call;

receiving, from the server, a first emotion score representing a degree of a first emotion associated with the first voice, and a second emotion score representing a degree of a second emotion associated with the first voice, wherein the first emotion score and the second emotion score are determined using a voice-based emotion scoring technique;

receiving, from the server, a first sentiment score associated with a first transcript of both the first voice and the second voice, a second sentiment score associated with a second transcript of the first voice, and a third sentiment score associated with a third transcript of the second voice, wherein the first sentiment score, the second sentiment score, and the third sentiment score are determined using a text-based sentiment scoring technique;

determining a quality score for the recording data based on the first emotion score, the second emotion score, the first sentiment score, the second sentiment score, and the third sentiment score;

determining classification data for the recording based on the quality score; and outputting the quality score and the classification data for visualization of the recording data.

15. The computer-implemented method of claim 14, wherein the first emotion and the second emotion are selected from anger, happiness, sadness, fear, or neutrality.

16. The computer-implemented method of claim 14, wherein determining the quality score for the recording data comprises:

determining the quality score as a weighted sum of the first emotion score, the second emotion score, the first sentiment score, the second sentiment score, and the third sentiment score.

17. The computer-implemented method of claim 16, wherein:
- the weighted sum is determined by applying weights to any one or more of: the first emotion score, the second emotion score, the first sentiment score, the second sentiment score, and the third sentiment score; and
- the weights are determined based on any one of:
  - a weight of the first emotion score is higher than a weight of the second emotion score in response to the first emotion score being higher than the second emotion score;
  - the weight of the second sentiment score is higher than the weight of the first sentiment score or a weight of the third sentiment score in response to the first participant being a customer and the second participant being an agent;
  - the weight of the first emotion score and the weight of the second sentiment score are linearly proportional based on the corresponding emotional score; or
  - the weight of the first emotion score and the weight of the second sentiment score are correlated based on the corresponding emotional score.

18. The computer-implemented method of claim 14, further comprising:
- receiving, from the server, a set of weighted keywords, wherein each keyword is associated with a weight value, and the server generates the set of weighted keywords based on the first transcript, the second transcript, or the third transcript; and
- outputting the set of weighted keywords, the quality score, and the classification data for visualization of the recording data.

19. The computer-implemented method of claim 18, further comprising:
- receiving, from the server, relationship data linking a portion of the recording data and a word in one of the first transcript, the second transcript, or the third transcript, wherein the relationship data enables finding the portion of the recording data by searching for the word.

20. The computer-implemented method of claim 14, further comprising:
- receiving, from the server, a third emotion score representing a degree of the first emotion associated with the second voice and a fourth emotion score representing a degree of the second emotion associated with the second voice; and
- determining the quality score based on the first emotion score, the second emotion score, the third emotion score, the fourth emotion score, the first sentiment score, the second sentiment score, and the third sentiment score.

* * * * *